(12) United States Patent
Senoo et al.

(10) Patent No.: US 7,237,442 B2
(45) Date of Patent: Jul. 3, 2007

(54) SEAT WEIGHT MEASURING APPARATUS

(75) Inventors: Tomotoshi Senoo, Shiga (JP); Masato Yokoo, Shiga (JP); Kousuke Nishigaki, Shiga (JP)

(73) Assignee: Takata Corporation, Tokyo (JP)

( * ) Notice: Subject to any disclaimer, the term of this patent is extended or adjusted under 35 U.S.C. 154(b) by 65 days.

(21) Appl. No.: 10/866,249

(22) Filed: Jun. 14, 2004

(65) Prior Publication Data
US 2005/0066748 A1    Mar. 31, 2005

(30) Foreign Application Priority Data
Sep. 30, 2003    (JP)    ............... 2003-340581

(51) Int. Cl.
*G01D 7/00*    (2006.01)
*G01L 1/22*    (2006.01)
(52) U.S. Cl. ............................................. 73/862.045
(58) Field of Classification Search ............................... 73/862.041–862.046
See application file for complete search history.

(56) References Cited

U.S. PATENT DOCUMENTS

| | | | | |
|---|---|---|---|---|
| 4,812,624 A | * | 3/1989 | Kern | ................. 219/448.14 |
| 5,392,660 A | * | 2/1995 | Hodson et al. | ........ 73/862.393 |
| 5,498,187 A | * | 3/1996 | Eggleston et al. | ............ 445/28 |
| 5,631,634 A | * | 5/1997 | Strelow | ...................... 340/626 |
| 5,644,184 A | * | 7/1997 | Kucherov | .................. 310/306 |
| 5,852,245 A | * | 12/1998 | Wesling et al. | ............... 73/723 |
| 6,323,444 B1 | | 11/2001 | Aoki | |
| 6,345,543 B1 | | 2/2002 | Aoki | |
| 6,378,384 B1 | * | 4/2002 | Atkinson et al. | ....... 73/862.625 |
| 6,571,647 B1 | | 6/2003 | Aoki et al. | |
| 6,942,203 B2 | * | 9/2005 | Schroder et al. | ............ 267/160 |
| 2003/0044131 A1 | * | 3/2003 | Stewart et al. | ................. 385/92 |

FOREIGN PATENT DOCUMENTS

| | | |
|---|---|---|
| JP | 2000-258234 | 9/2000 |
| JP | 2003-097997 A | 4/2003 |
| JP | 2003-130716 A | 5/2003 |

* cited by examiner

*Primary Examiner*—Max Noori
(74) *Attorney, Agent, or Firm*—Foley and Lardner LLP

(57) ABSTRACT

A seat weight measuring device reduces the temperature difference generated between the resistances of measuring gauges, even when a sudden ambient temperature change occurs. Heat due to ambient temperature is transferred through a column. As a washer interposed between a sensor plate and a nut and a washer interposed between the sensor plate and the column are composed of a material having low heat conductivity and providing electrical insulation, the heat transferred through the column is prevented from being transferred to the sensor plate by the washers. Accordingly, even when the ambient temperature changes suddenly, the temperature difference between the resistances of the strain gauges is reduced. Moreover, the washers provide electrical insulation between the sensor plate and the column.

24 Claims, 7 Drawing Sheets

SEAT WEIGHT MEASURING APPARATUS

BACKGROUND OF THE INVENTION

The present invention pertains to a technical field of seat weight measuring devices for measuring a seat weight including, for example, a load applied to a vehicle seat of an automobile. More specifically, the invention relates to the technical field of a seat weight measuring device having a sensor with measuring gauges such as strain gauges for measuring a force caused by the seat weight.

Japanese Unexamined Patent Application Publication No. 2000-258234 discloses a known seat weight measuring device, i.e., a device for receiving a force caused by the seat weight including a load applied to a vehicle seat of an automobile and having an arm for transmitting the force to a sensor. As illustrated in FIGS. 5A–5D, Japanese Unexamined Patent Application Publication No. 2000-258234 discloses a seat weight measuring device 100 which includes a pin bracket 101 for receiving the seat weight, an arm 102 for transmitting the force caused by the seat weight, a sensor 103 for measuring the seat weight by detecting the force transferred from tips 102A of the bifurcated arm 102, and a base frame 107 fixed to the vehicle body.

A stopper bolt 105 is passed through holes 106 on sidewalls 101L and 101R on the left and right sides of the pin bracket 101, respectively, and holes 109 formed on sidewalls 102L and 102R on the left and right sides of the arm 102, respectively. The stopper bolt 105 connects the pin bracket 101 and the arm 102 so that they are rotatable relative to each other. The stopper bolt 105 is passed through a vertically elongated hole 108 formed on sidewalls 107L and 107R on the left and right of the base frame 107, respectively.

The arm 102 is journalled with a pivot bolt 110 to the sidewalls 107L and 107R on the left and right side of the base frame 107, respectively. The tips 102A of the arm 102 transmit the force to upper and lower half arms 119 and 120 fixed with bolts 118 to force transmitters 104C and 104D on the ends of a sensor plate 104. In this way, the arm 102 receives the seat weight from the pin bracket 101, in the direction indicated by arrow a in FIG. 5(B), and transmits the force corresponding to the seat weight to the sensor plate 104 of the sensor 103 through the upper and lower half arms 119 and 120.

The sensor plate 104 of the sensor 103 is attached to a metal column 111 vertically disposed from the center of the bottom of the base frame 107 and is fixed by screwing a nut 112 with a metal washer 123 to the column 111. The sensor plate 104 flexibly bends in response to the force applied by the arm 102. Then, as illustrated in FIG. 6, the sensor 103 measures the seat weight by detecting the bending of the sensor plate 104 with four strain gauges 113, 114, 115, 116. The four strain gauges 113, 114, 115, 116 form a bridge circuit.

As illustrated in FIG. 6, the sensor plate 104 of the seat weight measuring device 100 has constrictions 104A and 104B. The four strain gauges 113, 114, 115, 116 are linearly disposed in the vicinity of these constrictions 104A and 104B so that the column 111 is disposed between the linearly arranged strain gauges 113, 114, 115, 116 with two strain gauges on each side. By disposing the strain gauges 113, 114, 115, 116 in the vicinity of the constrictions 104A and 104B of the sensor plate 104 in this way, when the force caused by the seat weight is transmitted to the force transmitters 104C and 104D of the sensor plate 104, one of the two strain gauges 113, 114 on one side of the column 111 and one of the two strain gauges 115, 116 on the other side of the column 111 are pulled in one direction while the other strain gauges are compressed in the other direction. Thus, one of the two strain gauges on the same side is pulled and the other is compressed. In this way, the sensitivity of the four strain gauges 113, 114, 115, and 116 forming the bridge circuit is increased and the force (i.e., the seat weight) can be measured accurately.

If the ambient temperature changes when the four strain gauges 113, 114, 115, 116 forming a bridge circuit measure the force transmitted to the sensor plate 104, the four strain gauges 113, 114, 115, 116 may become unbalanced and the accuracy of the measurement decreases. Therefore, to compensate for an error in the measurement caused by a change in the ambient temperature, a temperature sensing resistance 117 is disposed.

The sensor plate 104 has a layered structure with a lower insulating layer 126, a wiring layer 129, a resistive layer (which includes the strain gauges 113, 114, 115, 116) 130 and an upper insulating layer (a protective layer) 131 sequentially stacked on a metal substrate. Due to this structure, the heat resistance and corrosion resistance of the sensor plate 104 are improved.

In addition to the improvement of the heat resistance and corrosion resistance, the sensor plate 104 having such a layered structure may have an improved electromagnetic immunity (EMI) by adding a GND layer 127 on the metal substrate 125 with a lower insulating layer 126 interposed between the GND layer 127 and the metal substrate 125 (as shown, for example, in Japanese Unexamined Patent Application Publication No. 2003-097997). In such a case, the layered structure of the sensor plate 104 is as illustrated in FIG. 7.

More specifically, the sensor plate 104 is formed by stacking a lower insulating layer 126, a GND layer 127, a middle insulating layer 128, a wiring layer 129, a resistive layer (strain gauges) 130 and an upper insulating layer (protective layer) 131 sequentially on a metal substrate 125. However, it should be readily recognized that the sensor plate 104 shown in FIG. 7 is formed of many layers and, as a result, the production cost of this sensor plate 104 are high.

Moreover, if the ambient temperature of the seat weight measuring device 100 changes suddenly, a temperature difference for which the temperature sensing resistance 117 can not compensate may be generated between the resistances of the strain gauges 113, 114, 115, 116. Therefore, when such a sudden change occurs in the ambient temperature, there is a problem in that the force may not be measured accurately by the strain gauges 113, 114, 115, 116, even with a temperature sensing resistance 117. In such a case, a heat insulating material may be attached around the seat weight measuring device 100. The heat insulating material, however, cannot effectively suppress the change in the heat transmitted to the sensor plate 104 through the column 111.

SUMMARY OF THE INVENTION

According to an embodiment of the present invention there is provided a seat weight measuring device that can reduce the temperature difference generated between the resistances of the measuring gauges, even when the ambient temperature changes suddenly. Moreover, other embodiments of the present invention also provide a seat weight measuring device that can reduce the temperature difference generated between the resistances of the measuring gauges and can be produced at a lower cost by reducing the number of layers.

A seat weight measuring device according to an embodiment of the present invention comprises a base frame and a sensor attached to the base frame for detecting a load applied to a vehicle seat, wherein the sensor has a sensor plate with a plurality of measuring gauges and is fixed to a column formed on the base frame, a washer is interposed between the sensor plate and the column, and the washer is formed of a material having a low heat conductivity to prevent heat transfer thermally affecting the measuring gauges.

In a further embodiment of the invention, the seat weight measuring device may include a washer comprising a material that provides electrical insulation between the sensor plate and the column. Moreover, the washer may be simply interposed between the sensor plate and the column so that heat insulation and electrical insulation are effectively provided between the column and the sensor plate.

Another aspect this invention address a washer comprising a material having low heat conductivity which is interposed between the sensor plate and the column. Thus, the path by which heat is transferred from the column to the sensor plate is blocked and, even if heat caused by the ambient temperature of the seat weight measuring device is transferred through the column, the heat will not be further transferred from the column to the sensor plate. Accordingly, even if the ambient temperature changes suddenly, the temperature difference generated between the resistances of the measuring gauges can be effectively reduced. As a result, the force (i.e., the seat weight) can be measured accurately by the measuring gauges when the ambient temperature changes within a normal range and/or even when the ambient temperature changes suddenly.

In particular, the washer may provide electrical insulation between the column and the sensor plate, as the washer provides sufficient electrical insulation. Consequently, when the sensor plate has a layered structure, the lower insulating layer interposed between the substrate and the GND layer to provide insulation between the vehicle (the vehicle body) and the sensor plate may be omitted. In this way, the number of layers can be reduced and, therefore, the production cost of the sensor plate can be reduced.

Another embodiment of the invention addresses a seat weight measuring device comprising: a base frame; a sensor attached to the base frame, wherein the sensor is configured to detect a load applied to a vehicle seat, wherein the sensor comprises a sensor plate with a plurality of measuring gauges, and wherein the sensor is fixed to a column attached to the base frame; and a washer interposed between the sensor plate and the column, wherein the washer comprises a material having low heat conductivity to inhibit the transfer of heat which may otherwise thermally affect the measuring gauges.

Another embodiment of the invention addresses a seat weight measuring device for measuring a weight of a passenger positioned on a vehicle seat. In this embodiment, the seat weight measuring device includes: a base frame; a sensor attached to the base frame, wherein the sensor is configured to detect the weight of the passenger applied to the vehicle seat, wherein the sensor comprises a sensor plate with a plurality of measuring gauges, and wherein the sensor is fixed to a column attached to the base frame; and a washer interposed between the sensor plate and the column, wherein the washer is comprises a material having low heat conductivity to inhibit the transfer of heat which may otherwise thermally affect the measuring gauges.

Another embodiment of the invention addresses a seat weight measuring device for measuring a weight of a passenger positioned on a vehicle seat. In this embodiment, the seat weight measuring device includes: a base frame; an occupant detecting means attached to the base frame, wherein the occupant detecting means is configured to detect the weight of the passenger applied to the vehicle seat, wherein the occupant detecting means comprises a sensor plate with a plurality of measuring gauges, and wherein the occupant detecting means is fixed to a column attached to the base frame; and a washer interposed between the sensor plate and the column, wherein the washer comprises a material having low heat conductivity to inhibit the transfer of heat which may otherwise thermally affect the measuring gauges.

It is to be understood that both the foregoing general description and the following detailed description are exemplary and exemplary only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5A–5D are views of a conventional seat weight measuring device in which FIG. 5A is a plan view, FIG. 5B is a front view, FIG. 5C is a cross-sectional view taken along line C—C in FIG. 5B, and FIG. 5D is a cross-sectional view taken along line D—D in FIG. 5B.

DETAILED DESCRIPTION

Hereinafter, embodiments of the present invention will be described with reference to the attached drawings.

Figure 1:
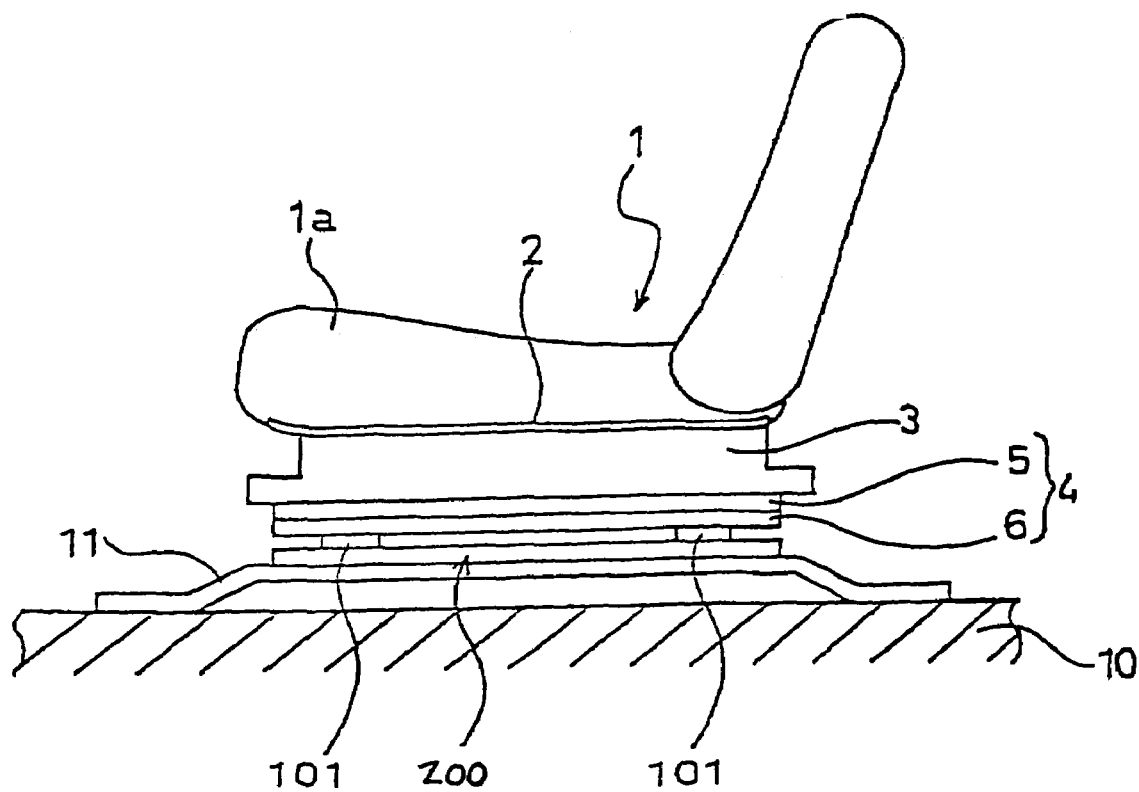
FIG. 1 is a side view of an embodiment of a seat weight measuring device according to the present invention.
Figure 2:
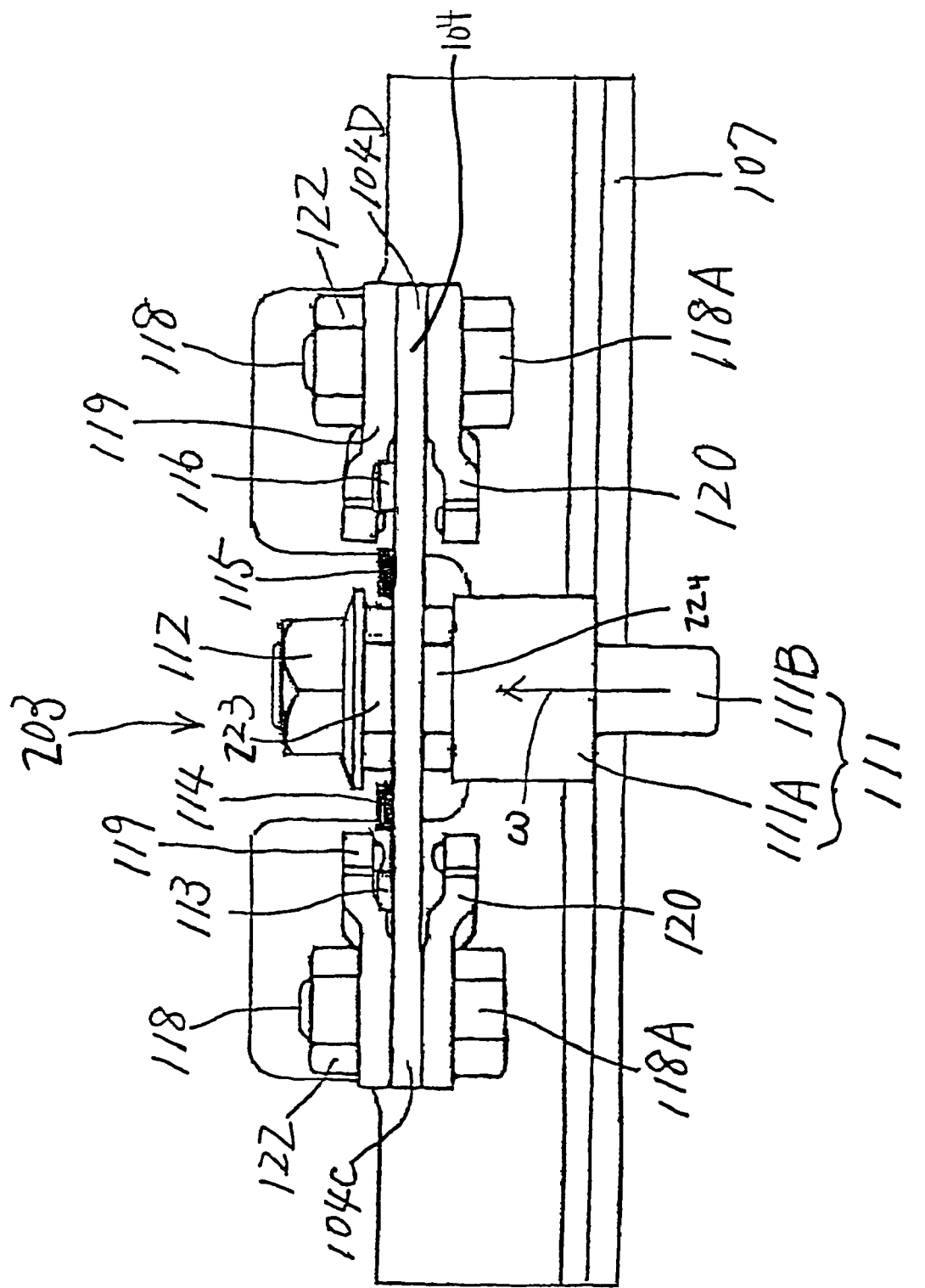
FIG. 2 is a side view of an embodiment of a sensor of a seat weight measuring device according to an embodiment of the present invention.
Figure 5A:
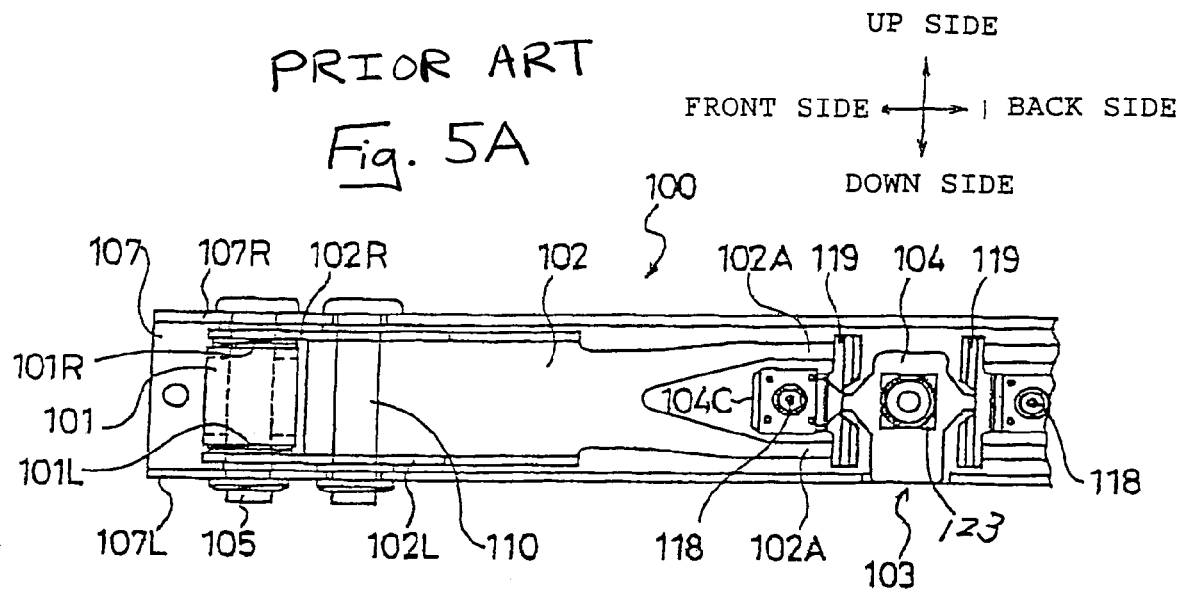
Figure 5B:
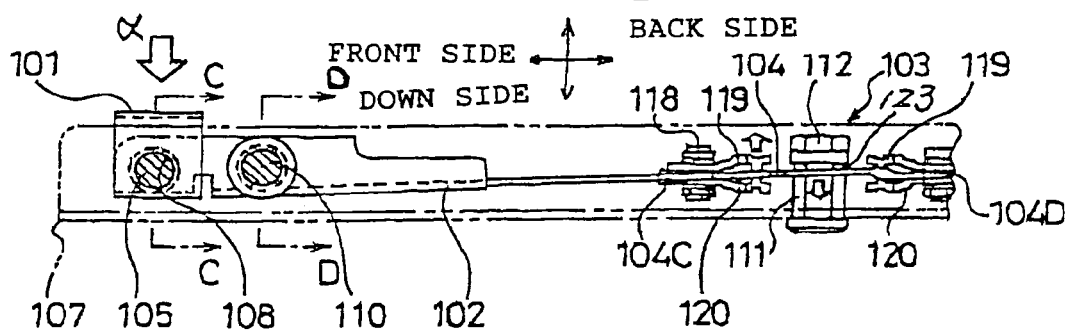
Figure 5C:
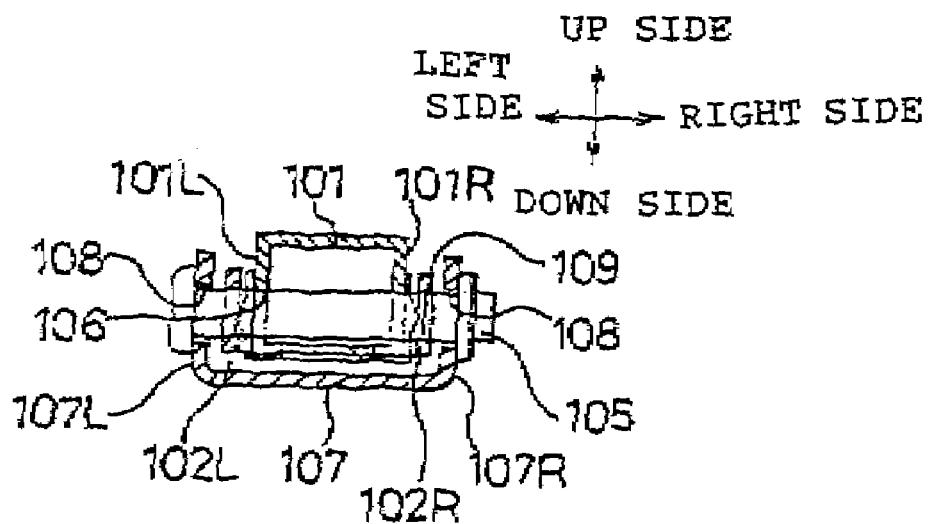
Figure 5D:
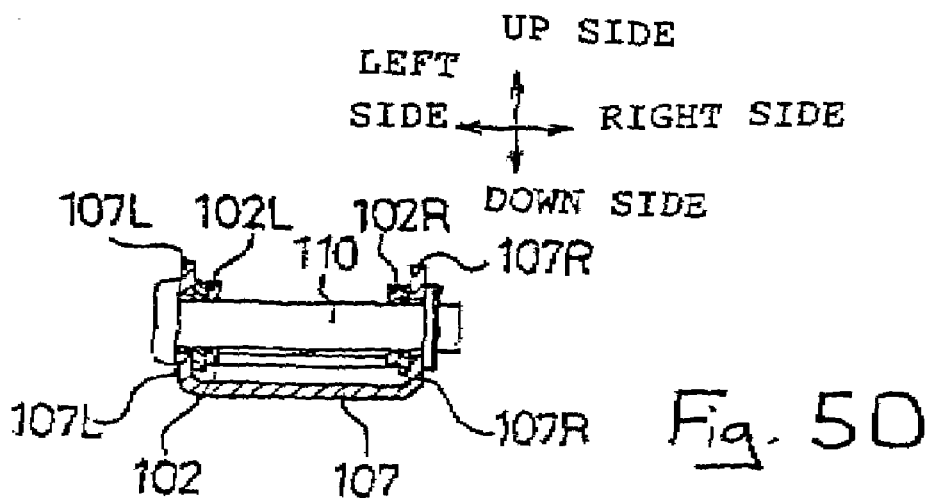
Figure 6:
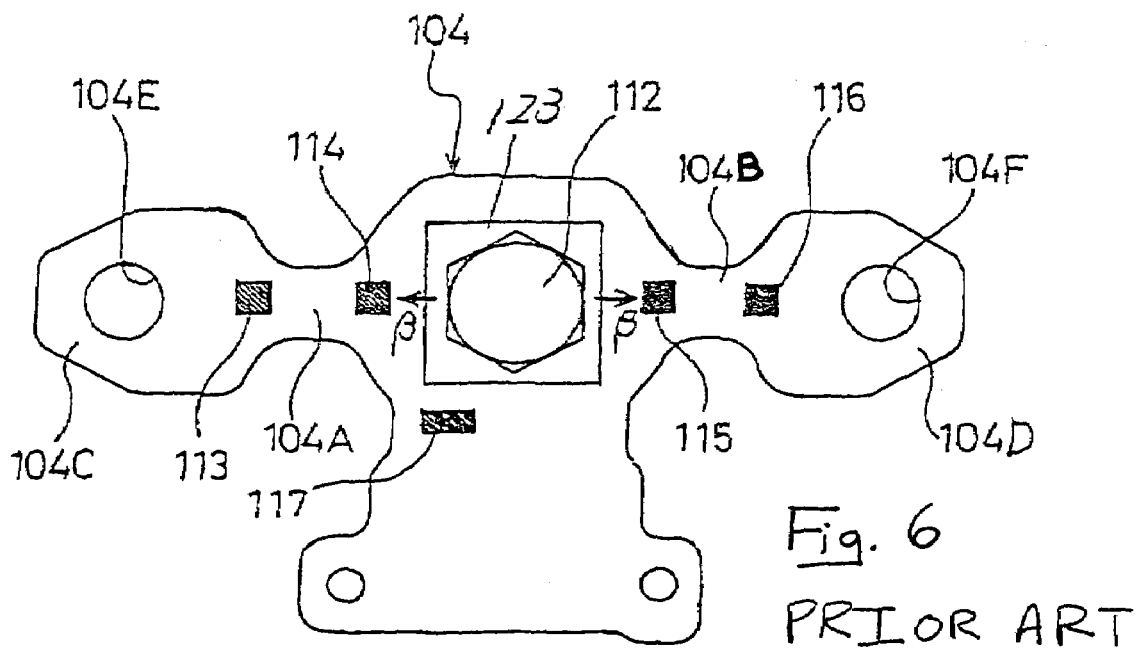
FIG. 6 is an overhead view of a conventional sensor plate of a seat weight measuring device.

FIG. 1 illustrates a seat weight measuring device according to the present invention. FIG. 2 illustrates a sensor of the seat weight measuring device according to an embodiment of the present invention. Components of this embodiment that are the same as the conventional seat weight measuring device previously discussed with respect to FIGS. 5A and 5B and FIG. 6 are indicated by the same reference numerals. The terms 'front side,' 'back side,' 'left side,' 'right side,' 'up side,' and 'down side' used in the description of the present invention indicate the front side, back side, left side, right side, up side, and down side, respectively, of a vehicle.

As illustrated in FIG. 1, a steel seat pan 2 covers the lower surface of a seat cushion 1a of a vehicle seat 1 in which a passenger may sit. On the lower surface of the seat pan 2, a pair of side frames 3 (only one of the side frames 3 is depicted in FIG. 1) is disposed downwards from the left and right sides of the seat pan 2 at a predetermined distance apart from each other. The side frames 3 extend from the front side to the back side of the vehicle seat 1.

On the lower edges of the side frames 3, seat rails 4 (only one of the seat rails 4 is depicted in FIG. 1) are attached. Each of the seat rails 4 includes an upper rail 5 fixed to the lower edge of each of the side frames 3 and a lower rail 6 attached to the upper rail 5 so that the lower rail 6 is slidable in the longitudinal direction of the vehicle relative to the upper rail 5. The seat rails 4 guide the vehicle seat 1 so that the vehicle seat 1 is slidable in the longitudinal direction of the vehicle.

On the lower surface of both lower rails 6, seat weight measuring devices 200 (only one of the seat weight measuring devices 200 is depicted in FIG. 1) are attached with a pair of (front and rear) pin brackets 101, which extend from the left to the right of the vehicle. The seat weight measuring devices 200 are fixed to a pair of seat brackets 11 (only one seat bracket 11 is depicted in FIG. 1), which is fixed to a vehicle floor 10. The seat brackets 11 are a predetermined distance apart from each other. By fixing the seat brackets 11 to the vehicle, the vehicle seat 1 can be stably supported by the vehicle body and, therefore, the weight (load) of the vehicle seat 1 (including the weight of a passenger which may be seated thereon) can be detected by the seat weight measuring devices 200 more accurately.

The seat weight measuring devices 200 may be directly fixed to the vehicle floor 10 without using the seat brackets 11. Each of the seat weight measuring devices 200 may also be interposed between the side frame 3 and the upper rail 5 of the seat rail 4.

Figure 3:
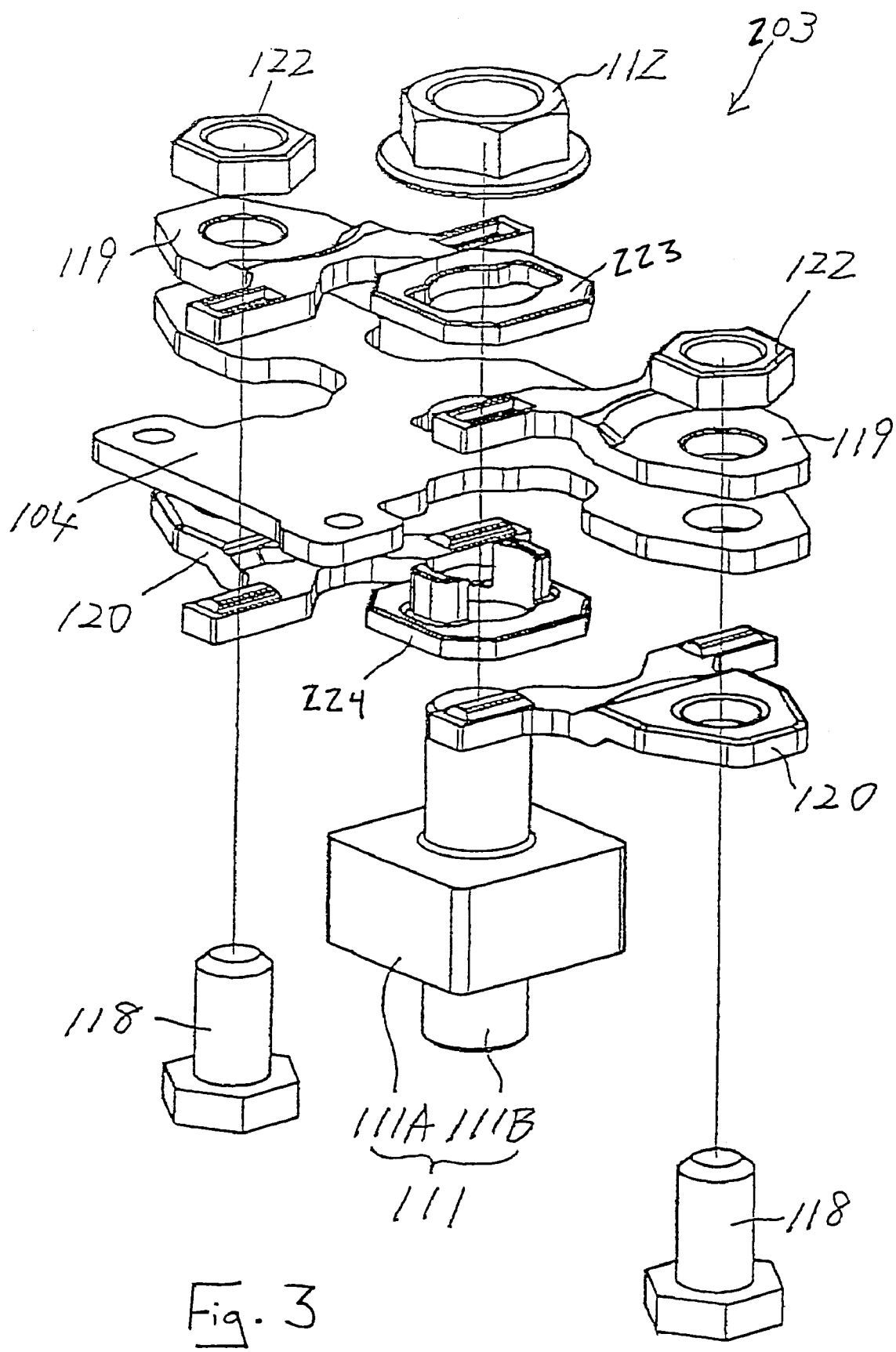
FIG. 3 is an exploded perspective view of the sensor illustrated in FIG. 2.

As illustrated in FIGS. 2 and 3, a sensor 203 of each of the seat weight measuring devices 200 according to this embodiment is structured in the same manner as the seat weight measuring device 100 disclosed in the above-mentioned Japanese Patent Application No. 2000-258234 in that upper and lower half arms 119 and 120 are fixed to force transmitters 104C and 104D with bolts 118. An arm 102 (not shown in FIGS. 2 and 3) transmits a force caused by the seat weight from tips 102A (not shown in FIGS. 2 and 3) to a sensor plate 104 of the sensor 203 through the upper and lower half arms 119 and 200. Strain gauges 113, 114, 115, 16, which form a bridge circuit, are attached to the sensor plate 104.

Similar to the seat weight measuring device 100 disclosed in the above-mentioned Japanese Patent Application No. 2000-258234, the sensor plate 104 of the seat weight measuring devices 200 according to this embodiment is fixed with a nut 112 to a metal column 111 vertically attached to the bottom surface of a base frame 107 (not shown in FIG. 3). In the seat weight measuring devices 200 according to this embodiment, washers 223, 224 are interposed between the nut 112 and the sensor plate 104 and between the larger portion 111A of the column 111 and the sensor plate 104, respectively. The washers 223, 224 include a material, such as zirconia, having low heat conductivity and providing electrical insulation. In this way, the washers 223, 224 provide thermal and electrical insulation between the sensor plate 104 and the column 111. The material having low heat conductivity used to compose the washers 223 and 224 may be any material that is capable of preventing (or at least greatly inhibiting) heat transfer which may otherwise thermally affect the strain gauges 113, 114, 115, 116.

Figure 4:
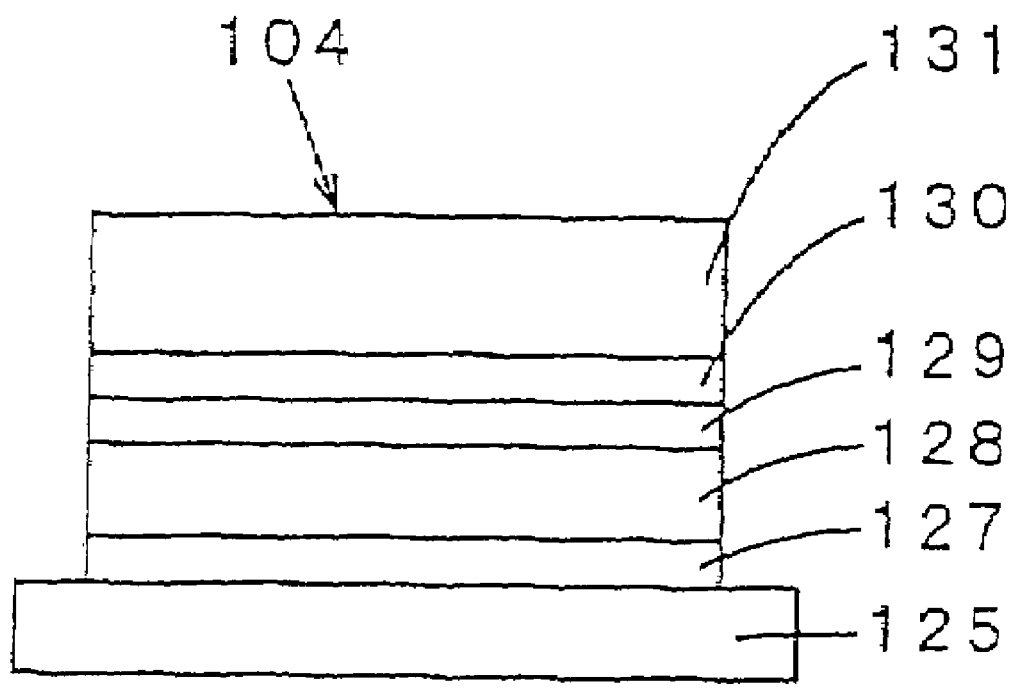
FIG. 4 illustrates the layered structure of a sensor plate included in the sensor illustrated in FIG. 2.

As illustrated in FIG. 4, the sensor plate 104 is formed by disposing a GND layer 127 on a substrate 125. On the GND layer 127, an middle insulating layer 128 is disposed. Then, on the middle insulating layer 128, a wiring layer 129 is disposed. On the wiring layer 129, a resistive layer (i.e., a layer formed by the strain gauges 113, 114, 115, 116) 130 is disposed. On the resistive layer 130, an upper insulating layer (i.e., protective layer) 131 is disposed. In this way, the sensor plate 104 has excellent heat resistance, corrosion resistance, and electromagnetic immunity (EMI).

Other structures of the seat weight measuring devices 200 according to this embodiment are the same as the structures of the seat weight measuring device 100 illustrated in FIGS. 5 and 6 and disclosed in the above-mentioned Japanese Patent Application No. 2000-258234. The seat weight measuring method for the seat weight measuring devices 200 according to this embodiment is the same as the method for the seat weight measuring device 100 disclosed in Japanese Patent Application No. 2000-258234.

In the seat weight measuring devices 200 according to this embodiment, the washers 223, 224 include a material having low heat conductivity and providing excellent electrical insulation are interposed between the sensor plate 104 and the column 111. Therefore, the path by which heat is transferred from the column 111 to the sensor plate 104 is blocked. Consequently, even if heat due to the ambient temperature is transferred through the column 111, as indicated by arrow ω in FIG. 2, the heat is prevented from being transferred from the column 111 to the sensor plate 104.

For this reason, even if the ambient temperature changes suddenly, as previously described, the temperature difference generated between the resistances of the strain gauges 113, 114, 115, 116 can be effectively reduced. As a result, the force, i.e., the seat weight, can be measured accurately by the strain gauges 113, 114, 115, 116 when the ambient temperature changes within a normal range or even when the ambient temperature changes suddenly.

The column 111 and the sensor plate 104 are electrically insulated. Thus, as illustrated in FIG. 4, the lower insulating layer 126 (which provides insulation between the vehicle body and the sensor plate 104) of the convention seat weight measuring device 100 shown in Fig. can be omitted. As a result, the number of layers can be reduced and, therefore, the production cost can be reduced.

As the washers 223, 224 are simply interposed between the sensor plate 104 and the column 111, heat insulation and electrical insulation are effectively provided between the column 111 and the sensor plate 104.

Figure 7:
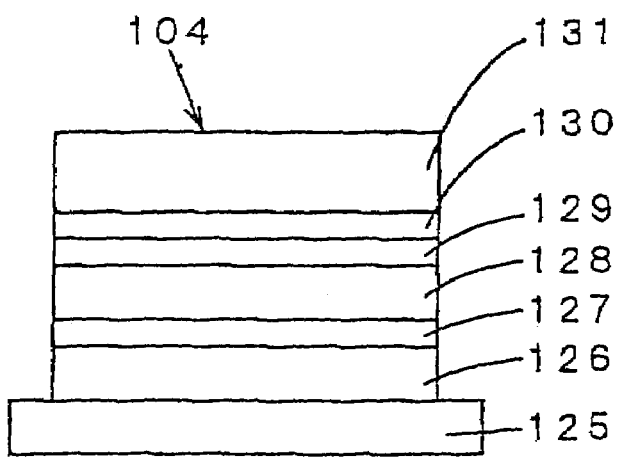
FIG. 7 illustrates the layered structure of a sensor plate included in a conventional sensor.

In the embodiment above, the washers 223, 224 include a material having low heat conductivity and providing electrical insulation. The present invention, however, is not limited to this; the washers 223, 224 may include a material merely having low heat conductivity. In such a case, however, the lower insulating layer 126 illustrated in FIG. 7 may be required. Hence, it is preferable to compose the washers 223, 224 of a material having low heat conductivity and providing electrical insulation.

In the conventional embodiment, the arm 102 is bifurcated and has two active parts (tips 102A) for transmitting the force to the sensor plate 104. The arm 102 of the present invention, however, may have one active part (tip 102A) to transmit the force to the sensor plate 104.

Furthermore, the seat weight measuring devices 200 may be interposed between the side frame 3 of the vehicle seat 1 and the upper rail 5 of the seat rail 4.

In the above-mentioned embodiment, a pivot bolt 110 may be disposed closer to the sensor 203 than a stopper bolt 105. The stopper bolt 105, however, may be disposed closer to the sensor 203 than the pivot bolt 110.

Although in the above-mentioned embodiment, strain gauges 113, 114, 115, 116 were used, other measuring gauges may be used to measure the force.

The seat weight measuring devices 100 according to the present invention may be suitably used for various apparatuses, such as a seatbelt apparatus used to constrain and protect a passenger in accordance with the seat weight, installed on a seat in a vehicle such as an automobile and controlled in accordance with the vehicle seat weight.

The priority application, Japanese Patent Application No. 2003-340581, filed Sep. 30, 2003, including the specification, drawings, claims and abstract, is incorporated herein by reference in its entirety Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat weight measuring device comprising:
   a base frame;
   a sensor attached to the base frame for detecting a load applied to a vehicle seat, wherein the sensor includes a sensor plate with a plurality of measuring gauges, and wherein the sensor is fixed to a column attached to the base frame; and
   at least one washer that is interposed between the sensor plate and the column and that includes a material having low heat conductivity to prevent the transfer of heat from thermally affecting the measuring gauges.

2. The seat weight measuring device according to claim 1, wherein the at least one washer includes a material providing electrical insulation between the sensor plate and the column.

3. A seat weight measuring device comprising:
   a base frame;
   a sensor attached to the base frame, wherein the sensor is configured to detect a load applied to a vehicle seat, wherein the sensor comprises a sensor plate with a plurality of measuring gauges, and wherein the sensor is fixed to a column attached to the base frame; and
   at least one washer interposed between the sensor plate and the column, wherein the at least one washer includes a material having low heat conductivity to inhibit the transfer of heat which may otherwise thermally affect the measuring gauges.

4. The seat weight measuring device according to claim 3, wherein the at least one washer comprises two washers, wherein a first of the two washers is disposed above the sensor plate, and wherein a second of the two washers is disposed below the sensor plate.

5. The seat weight measuring device according to claim 3, wherein the at least one washer is formed of zirconia.

6. The seat weight measuring device according to claim 3, wherein the at least one washer includes a material providing electrical insulation between the sensor plate and the column.

7. The seat weight measuring device according to claim 6, wherein the material is zirconia.

8. A seat weight measuring device for measuring a weight of a passenger positioned on a vehicle seat comprising:
   a base frame; and
   a sensor fixed to a column attached to the base frame, wherein the sensor is configured to detect the weight of the passenger applied to the vehicle seat and includes a sensor plate with a plurality of measuring gauges, and wherein a washer that is formed of zirconia, which has a low thermal conductivity, is interposed between the sensor plate and the column to thereby inhibit the transfer of heat from the frame to the sensor.

9. The seat weight measuring device according to claim 8, wherein the washer comprises two washers, wherein a first of the two washers is disposed above the sensor plate, and wherein a second of the two washers is disposed below the sensor plate.

10. The seat weight measuring device according to claim 3, wherein the sensor plate comprises: a substrate; a ground layer disposed on the substrate; a middle insulating layer disposed on the ground layer; a wiring layer disposed on the middle insulating layer; a resistive layer disposed on the wiring layer; and an upper insulating layer disposed on the resistive layer.

11. The seat weight measuring device according to claim 8, wherein the washer includes a material providing electrical insulation between the sensor plate and the column.

12. The seat weight measuring device according to claim 11, wherein the material is zirconia.

13. An occupant detecting device comprising:
   a seat weight measuring device for measuring a weight of an occupant positioned on a vehicle seat, wherein the seat weight measuring device includes a base frame and a sensor plate with a plurality of measuring gauges, wherein the sensor plate is fixed to a column attached to the base frame, wherein at least one washer is interposed between the sensor plate and the column, and wherein the at least one washer includes a material having low thermal conductivity to thereby inhibit the transfer of heat to the measuring gauges.

14. The occupant detecting device of claim 13, wherein the at least one washer comprises two washers, wherein a first of the two washers is disposed above the sensor plate, and wherein a second of the two washers is disposed below the sensor plate.

15. The occupant detecting device of claim 13, wherein the at least one washer comprises zirconia.

16. The occupant detecting device of claim 13, wherein the at least one washer comprises a material providing electrical insulation between the sensor plate and the column.

17. The occupant detecting device of claim 16, wherein the material is zirconia.

18. The seat weight measuring device according to claim 1, wherein the sensor plate comprises: a substrate; a ground layer disposed on the substrate; a middle insulating layer disposed on the ground layer; a wiring layer disposed on the middle insulating layer; a resistive layer disposed on the wiring layer; and an upper insulating layer disposed on the resistive layer.

19. The seat weight measuring device according to claim 18, wherein the resistive layer includes the measuring gauges.

20. The seat weight measuring device according to claim 10, wherein the resistive layer includes the measuring gauges.

21. The seat weight measuring device according to claim 8, wherein the sensor plate comprises: a substrate; a ground layer disposed on the substrate; a middle insulating layer disposed on the ground layer; a wiring layer disposed on the middle insulating layer; a resistive layer disposed on the wiring layer; and an upper insulating layer disposed on the resistive layer.

22. The seat weight measuring device according to claim 21, wherein the resistive layer includes the measuring gauges.

23. The occupant detecting device according to claim 13, wherein the sensor plate comprises: a substrate; a ground layer disposed on the substrate; a middle insulating layer disposed on the ground layer; a wiring layer disposed on the middle insulating layer; a resistive layer disposed on the wiring layer; and an upper insulating layer disposed on the resistive layer.

24. The occupant detecting device according to claim 23, wherein the resistive layer includes the measuring gauges.

* * * * *